US008585215B2

(12) United States Patent
Nakano

(10) Patent No.: US 8,585,215 B2
(45) Date of Patent: Nov. 19, 2013

(54) PROJECTOR WITH LIGHT-SHIELDING MEMBER AND HOLDING MEMBER HAVING VARIED COEFFICIENT OF THERMAL CONDUCTIVITY

(75) Inventor: Hirohisa Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 312 days.

(21) Appl. No.: 12/693,748

(22) Filed: Jan. 26, 2010

(65) Prior Publication Data
US 2010/0188640 A1 Jul. 29, 2010

(30) Foreign Application Priority Data
Jan. 28, 2009 (JP) ................................ 2009-016309

(51) Int. Cl.
*G03B 21/14* (2006.01)
*G03B 21/18* (2006.01)
*G03B 21/22* (2006.01)
*G03B 21/26* (2006.01)
*G02B 9/00* (2006.01)
*G02B 9/08* (2006.01)
*G02B 26/02* (2006.01)

(52) U.S. Cl.
USPC ................. 353/97; 353/56; 353/75; 359/230; 359/234; 359/236; 359/738

(58) Field of Classification Search
USPC ........ 353/55–56, 97, 75, 85–86, 88; 359/227, 359/230, 232–236, 738–739
See application file for complete search history.

(56) References Cited

U.S. PATENT DOCUMENTS

| 7,182,470 | B2* | 2/2007 | Hashimoto et al. | 353/97 |
| 7,185,990 | B2* | 3/2007 | Koga et al. | 353/97 |
| 7,344,255 | B2* | 3/2008 | Hara et al. | 353/88 |
| 7,798,653 | B2* | 9/2010 | Inui et al. | 353/97 |
| 8,189,253 | B2* | 5/2012 | Yamamura et al. | 359/232 |
| 2007/0070298 | A1* | 3/2007 | Hara et al. | 353/57 |
| 2009/0225389 | A1 | 9/2009 | Nakano | |
| 2011/0085145 | A1* | 4/2011 | Hayashi | 353/38 |

FOREIGN PATENT DOCUMENTS

| JP | A-2007-47394 | 2/2007 |
| JP | A-2007-71913 | 3/2007 |
| JP | A-2009-244848 | 10/2009 |

* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

A projector includes: a light source, a light amount control device, an electro-optic unit, and a projection device, the light amount control device includes a light-shielding member configured to shield part of the luminous flux emitted from the light source, a holding member configured to hold the light-shielding member, the holding member is formed of a material having a coefficient of thermal conductivity lower than the coefficient of thermal conductivity of the light-shielding member, and a position changing unit configured to move or rotate in order to change the position of the light-shielding member, the light-shielding member is attached to the position changing unit via the holding member, and the light-shielding member comes into contact with the holding member via a projection provided on at least one of the light-shielding member and the holding member.

7 Claims, 11 Drawing Sheets

PROJECTOR WITH LIGHT-SHIELDING MEMBER AND HOLDING MEMBER HAVING VARIED COEFFICIENT OF THERMAL CONDUCTIVITY

BACKGROUND

1. Technical Field

The present invention relates to a projector configured to project an image light.

2. Related Art

In the related art, a projector configured to form an image light by modulating a luminous flux emitted from a light source according to image data, and project the image light onto a screen or the like. The projector is used in various applications such as presentations in companies or appreciation of movies in the family. In order to improve a contrast of an image, a technique to control amount of light of the luminous flux emitted from the light source using a light amount control device is proposed (see JP-A-2007-71913).

The light amount control device disclosed in JP-A-2007-71913 includes a rectangular tubular shaped fixing member, a supporting shaft (axis of rotation) attached to the fixing member, a shielding member configured to partly shield the luminous flux emitted from the light source, a drive gear, a motor having a pinion, and so on, and is arranged in an optical component housing.

The shielding member includes the drive gear attached at one end, and the drive gear engages the pinion, and is rotatably supported by the supporting shaft. The other end of the shielding member is rotatably supported by the fixing member. When the motor is driven, in the light amount control device, the drive gear is rotated, the position of the shielding member is changed to partly shield the luminous flux from the light source according to the position of the shielding member, so that the amount of light is controlled.

JP-A-2007-71913 is an example of related art.

However, the light amount control device disclosed in JP-A-2007-71913 has a probability such that when the temperature rises in association with the shielding of the luminous flux by the shielding member, heat of the shielding member is transferred to the drive gear attached to the shielding member, and hence the drive gear is thermally deformed. When the drive gear is deformed, the rotation may become unstable, or the rotation may be disabled. Consequently, the shielding member cannot be changed in position with high degree of accuracy, so that adequate modulation of the amount of light may not be achieved by the light amount control device.

SUMMARY

An advantage of some aspects of the invention is to solve at least a part of the problems described above and can be embodied as the following modes or aspects.

A first aspect of the invention is directed to a projector including: a light source, a light amount control device configured to control a amount of light of a luminous flux emitted from the light source, an electro-optic unit configured to modulate the luminous flux passing through the light modulation device according to image data and form an image light, and a projection device configured to project the image light, the light amount control device includes a light-shielding member configured to shield part of the luminous flux emitted from the light source; a holding member configured to hold the light-shielding member, the holding member is formed of a material having a coefficient of thermal conductivity lower than the coefficient of thermal conductivity of the light-shielding member, and a position changing unit configured to move or rotate in order to change the position of the light-shielding member, the light-shielding member is attached to the position changing unit via the holding member, and the light-shielding member comes into contact with the holding member via a projection provided on at least one of the light-shielding member and the holding member.

In this projector, the light amount control device configured to control the amount of passing luminous flux is provided, and the light amount control device includes the light-shielding member, the holding member configured to hold the light-shielding member, and the position changing unit. The light-shielding member is attached to the position changing unit via the holding member, and the holding member is formed of a material having the coefficient of thermal conductivity lower than the coefficient of thermal conductivity of the light-shielding member.

Accordingly, when the temperature rises in association with shielding of the luminous flux by the light-shielding member, the heat of the light-shielding member is hardly transferred to the holding member, whereby the temperature rise is restrained. Therefore, the temperature rise of the position changing unit where the light-shielding member is attached via the holding member is also restrained, and the position changing unit is restrained from thermal deformation or the like. The position changing unit is able to be maintained stably in shape, so that the position of the light-shielding member can adequately be changed. Therefore, according to the projector, the light amount control device controls the amount of light stably even when the temperature of the light-shielding member rises, so that enhancement of the image quality such as contrast is achieved for projection.

According to the projector in this configuration, since the light-shielding member is in abutment with the holding member via the projection provided on at least one of the light-shielding member and the holding member, the surface area of abutment between the light-shielding member and the holding member is small, so that the periphery of a portion of abutment between the both members allows air to circulate. Therefore, the heat from the light-shielding member can further hardly be transferred to the holding member, the temperature rise of the position changing unit is further restrained, whereby the position changing unit is maintained in shape further stably.

Preferably, the light-shielding member includes a light-shielding body portion configured to shield part of the luminous flux, a mounting portion to be mounted on the holding member, and a bridge portion bridged between the light-shielding body portion and the mounting portion, and the bridge portion has a cross-sectional area smaller than the cross-sectional areas of the light-shielding body portion and the mounting portion in a cross section substantially orthogonal to a direction from the light-shielding body portion toward the mounting portion.

According to the projector in this configuration, the light-shielding member includes the light-shielding body portion, the mouthing portion, and the bridge portion to be bridged between the light-shielding body portion and the mounting portion. The light-shielding member is configured in such a manner that the light-shielding body portion shields part of the luminous flux, and the mounting portion is mounted to the position changing unit via the holding member. Since the bridge portion is formed to have a cross-sectional area smaller than the cross-sectional areas of the light-shielding body portion and the mounting portion, when the temperature rises in association with the shielding of the luminous flux by the light-shielding body portion, the heat is hardly transferred from the light-shielding body portion to the mounting portion, whereby the temperature rise of the mounting portion is restrained. Therefore, the temperature rise of the holding member where the mounting portion is attached, and hence the temperature rise of the position changing unit is further restrained, whereby the position changing unit is maintained in shape further stably.

Preferably, a heat-shielding member configured to restrain heat transfer is arranged at least one of between the light-shielding member and the holding member, and between the holding member and the position changing unit.

According to the projector in this configuration, the thermal transfer from the light-shielding member to the holding member hardly occurs by arranging the heat-shielding member between the light-shielding member and the holding member, and the thermal transfer from the holding member to the position changing unit hardly occurs by arranging the heat-shielding member between the holding member and the position changing unit. Therefore, the heat from the light-shielding member can further hardly be transferred to the position changing unit, whereby the position changing unit is maintained in shape further stably.

Preferably, the light-shielding member is formed of a material having a coefficient of thermal conductivity of 100 W/m·k or higher.

According to the projector in this configuration, since the light-shielding member is formed of a member having a coefficient of thermal conductivity of 100 W/m·k or higher, for example, aluminum, copper, magnesium, and alloys containing the same, undesired part of the luminous flux is reliably shielded by the light-shielding member, and the light amount control device is able to control the amount of light highly efficiently.

BRIEF DESCRIPTION OF THE DRAWINGS

The invention will be described with reference to the accompanying drawings wherein like numbers reference like elements.

DESCRIPTION OF EXEMPLARY EMBODIMENTS

First Embodiment

Figure 1:
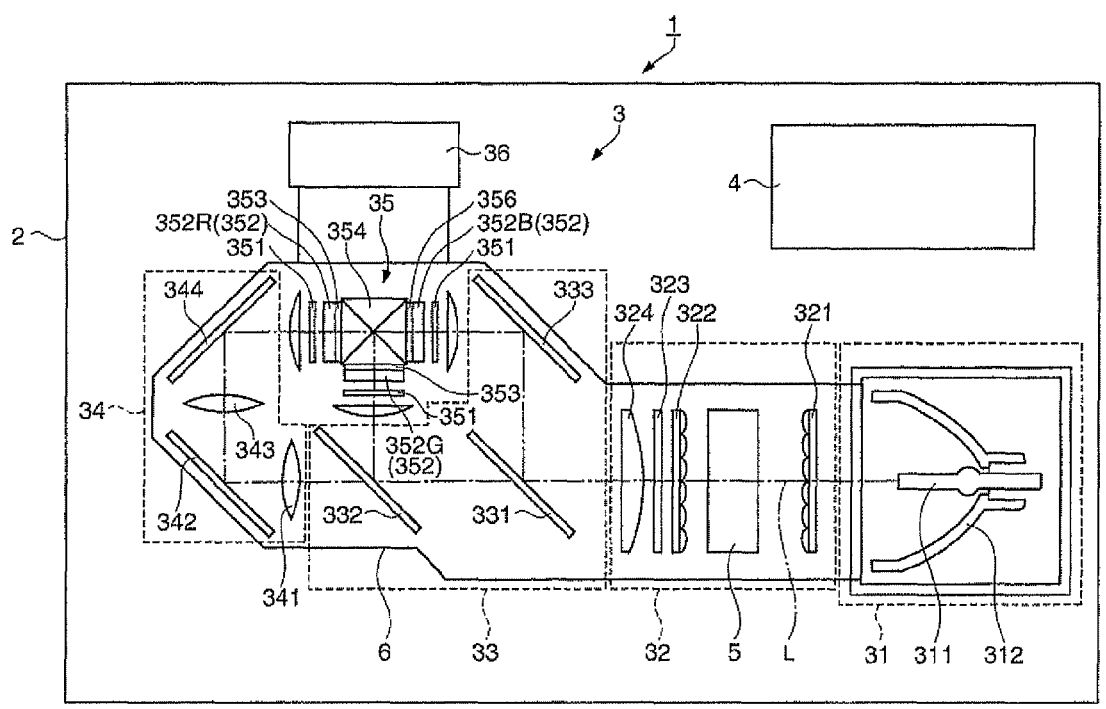
FIG. 1 is a diagrammatic drawing showing a schematic configuration of a projector according to a first embodiment.

Referring now to the drawings, a projector according to a first embodiment will be described.

The projector according to the first embodiment modulates a luminous flux emitted from a light source according to image data, forms an image light, and projects the image light onto a screen or the like in an enlarged scale.

FIG. 1 is a diagrammatic drawing showing a schematic configuration of the projector according to the first embodiment.

As shown in FIG. 1, a projector 1 includes an outer housing 2, a control unit (not shown), an optical unit 3 having a light source 311, and a power source unit 4 configured to supply electric power to the light source 311 and the control unit. Although not illustrated, a cooling fan or the like configured to cool the interior of the projector 1 is arranged in the outer housing 2.

The control unit including a CPU (Central Processing Unit), a ROM (Read Only Memory), and a RAM (Random Access Memory) functions as a computer, and performs control of the operation of the projector 1, for example, control relating to projection of images.

The optical unit 3 optically processes the luminous flux emitted from the light source 311, forms the image light according to the image data, and projects the same under the control of the control unit.

As shown in FIG. 1, the optical unit 3 includes a light source unit 31, an illumination unit 32, a color separation unit 33, a relay optical unit 34, an electro-optic unit 35, a projection lens 36 as a projection device, and an optical component housing 6 configured to arrange the respective optical components 31 to 36 at predetermined positions.

The light source unit 31 includes the light source 311 of a discharge type including a extra-high pressure mercury lamp or metal halide lamp or the like and a reflector 312. The light source unit 31 aligns the direction of emission of the luminous flux emitted from the light source 311 by the reflector 312, and emits the same toward the illumination unit 32.

The illumination unit 32 includes a first lens array 321, a second lens array 322, a polarization conversion element 323, a superimposing lens 324, and a light amount control device 5.

The first lens array 321 has a configuration in which small lenses having a substantially rectangular contour when viewed in the direction of an optical axis L of the luminous flux emitted from the light source 311 are arranged in a matrix pattern, and splits the luminous flux emitted from the light source unit 31 into a plurality of partial luminous fluxes. The second lens array 322 has a substantially similar configuration to the first lens array 321, and is configured to superimpose the partial luminous fluxes substantially onto the surface of a liquid crystal panel 352, described later, in association with the superimposing lens 324. The polarization conversion element 323 has a function to align a random polarized light going out from the second lens array 322 into one type of polarized light which can be used by the liquid crystal panel 352.

The light amount control device 5 includes dimmer units 8 and 9 (see FIG. 2) configured to dim the luminous flux emitted from the light source 311 (hereinafter, referred to as "light source luminous flux"), and has a function to control an amount of passing light of the light source luminous flux.

The light amount control device 5 includes the dimmer units 8 and 9 arranged between the first lens array 321 and the second lens array 322. The light amount control device 5 dims the luminous flux emitted from the light source 311 and passing through the first lens array 321 to control the amount of light entering the second lens array 322 and hence the amount of light entering the electro-optic unit 35 under the control of the control unit, thereby contributing to improvement of contrast of a projected image. The configuration of the light amount control device 5 will be described later in detail.

The color separation unit 33 includes two dichroic mirrors 331 and 332 and a reflection mirror 333, and has a function to split the luminous flux going out from the illumination unit 32 into three colored lights; a red light (hereinafter, referred to as "R-light"), a green light (hereinafter, referred to as "G-light"), and a blue light (hereinafter, referred to as "B-light").

The relay optical unit 34 includes a light incident-side lens 341, a relay lens 343, and reflection mirrors 342 and 344, and has a function to guide the B-light passing through the second dichroic mirror 332 to a liquid crystal panel 352R for the R-light. Although the optical unit 3 has a configuration such that the relay optical unit 34 guides the R-light, the invention is not limited thereto, and a configuration in which the B-light is guided is also applicable.

The electro-optic unit 35 includes a light incident-side polarizer 351, liquid crystal panels 352 as light modulation devices, light outgoing-side polarizer 353, and a cross dichroic prism 354 as a color combining device. The electro-optic unit 35 modulates the luminous fluxes split into respective colored lights by the color separation unit 33 according to the image data, and forms the image light.

The projection lens 36 is configured as a lens unit having a combination of a plurality of lenses, and projects the image light formed by the electro-optic unit 35 onto the screen in an enlarged scale.

Figure 2:
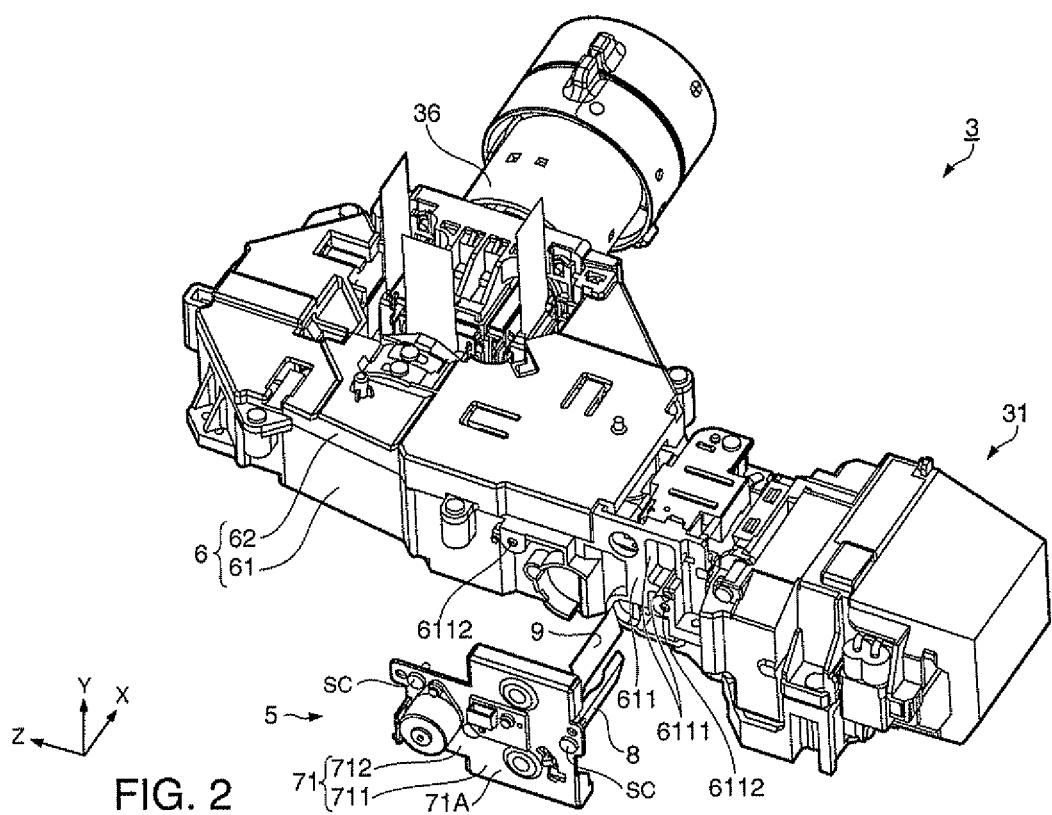
FIG. 2 is a perspective view of an optical unit according to the first embodiment.

FIG. 2 is a perspective view of the optical unit 3. More specifically, FIG. 2 is a drawing of the optical unit 3 viewed from a direction opposite to the direction in which the image light is projected, and showing a state in which the light amount control device 5 is disassembled.

As shown in FIG. 2, the light source unit 31 is demountably arranged at one end of the optical component housing 6, and the projection lens 36 is arranged in the vicinity of the other end thereof. In the following description, a direction in which the luminous flux is emitted from the light source unit 31 is referred to as "left" (+Z direction), a direction orthogonal to the Z-direction and in which the image light is projected is referred to as "front" (+X direction), and a direction orthogonal to the Z direction and X direction and an upper direction in FIG. 2 is referred to as "up" (+Y direction) for the sake of convenience of description.

As shown in FIG. 2, the optical component housing 6 is formed of synthetic resin into a box shape extending longitudinally in the Z direction. The optical component housing 6 has an opening directed upward (+Y direction), and includes a lower housing 61 configured to store optical components described above therein, and an upper housing 62 configured to close the opening.

The lower housing 61 is formed of a high heat-resistant material such as BMC (Bulk Molding Compound) or the like, and includes a bottom surface portion arranged along the bottom surface of the outer housing 2, and side surface portions 611 projecting upright from end edges of the bottom surface portion. The lower housing 61 is formed into a substantially U-shape in cross section with these members. The lower housing 61 is formed with a plurality of grooves on inner wall surfaces of the side surface portions 611, and respective optical components such as the first lens array 321 are arranged in a state in which the side end portions thereof are inserted into these grooves.

As shown in FIG. 2, openings 6111 are formed on the side surface portions 611 on the rear side (−X side) and a plurality of screw holes 6112 are provided in the vicinity of the openings 6111. The light amount control device 5 is mounted in the lower housing 61 with the dimmer units 8 and 9 inserted from the openings 6111 and arranged between the first lens array 321 and the second lens array 322, and screws SC inserted into the screw holes 6112. A plurality of screw holes for attaching the upper housing 62 are provided on an outer peripheral edge portion of the lower housing 61.

The upper housing 62 is formed of PBT (Poly Butylene Terephthalate) containing glass fibers or the like and is fixed to the lower housing 61 with screws.

In this manner, the optical component housing 6 includes the optical components arranged at predetermined positions on the optical axis L.

Here, the light amount control device 5 will be described in detail.

Figure 3:
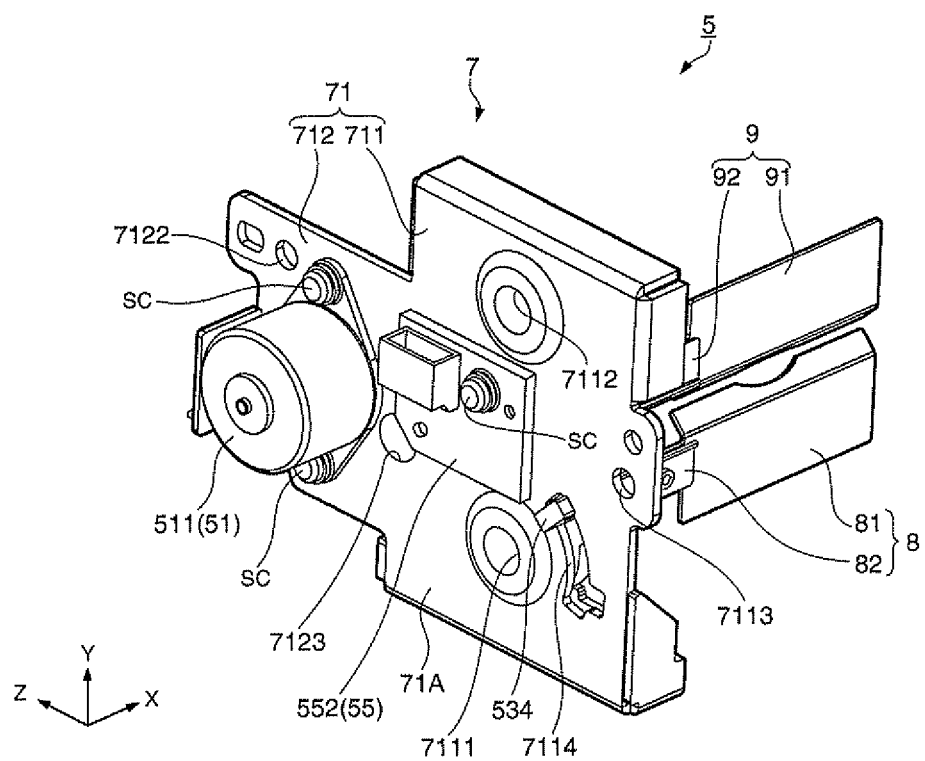
FIG. 3 is a perspective view of a light amount control device according to the first embodiment, viewed from the rear.
Figure 4:
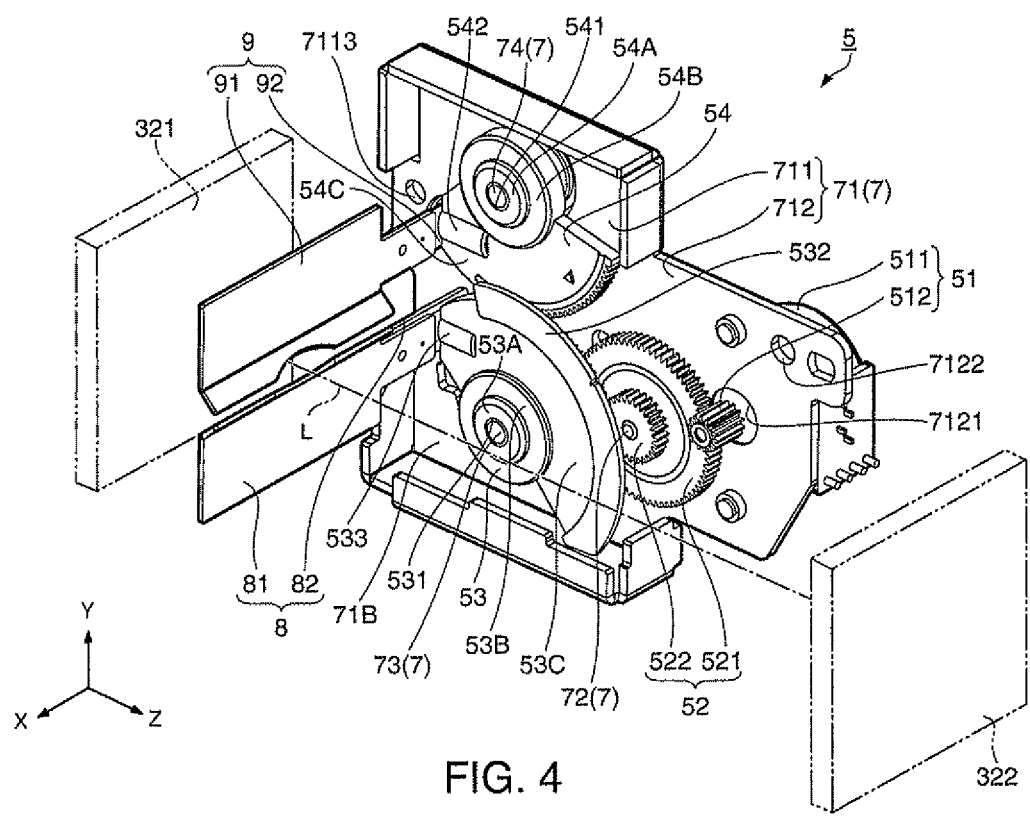
FIG. 4 is a perspective view of the light amount control device according to the first embodiment, viewed from the front.
Figure 5:
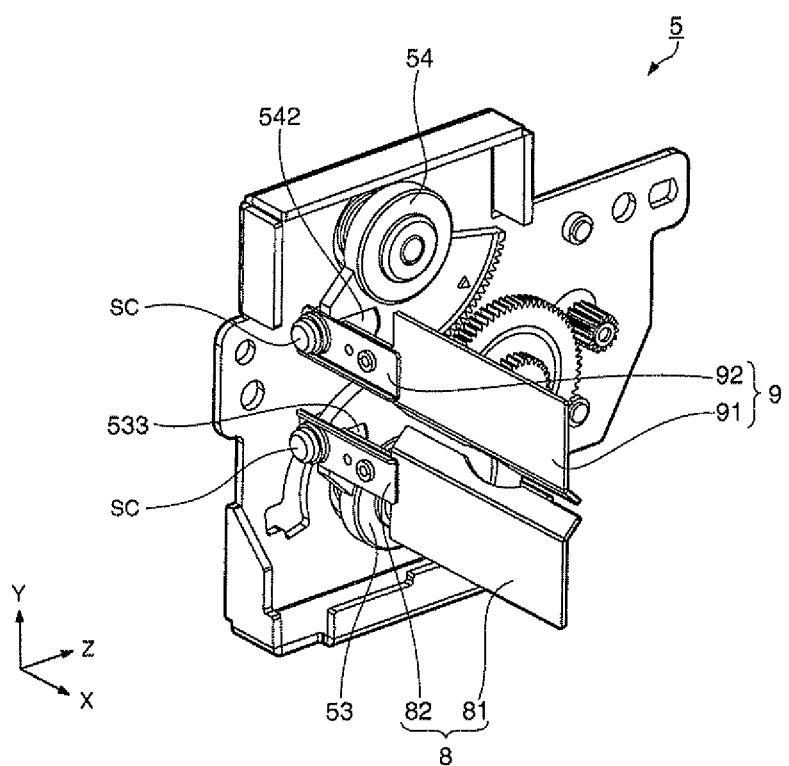
FIG. 5 is a perspective view of the light amount control device according to the first embodiment, viewed from the right.

FIGS. 3 to 5 are perspective views showing the light amount control device 5. More specifically, FIG. 3 is a drawing viewed from the rear, FIG. 4 is a drawing viewed from the front, and FIG. 5 is a drawing viewed from the right. FIG. 4 includes the first lens array 321 and the second lens array 322 (shown by double-dashed chain lines) shown schematically for explaining the position of the light amount control device 5 with respect to the first lens array 321 and the second lens array 322.

The light amount control device 5 includes a base unit 7, a stepping motor (hereinafter, abbreviated as "motor") 51, a first gear 52, a second gear 53, a third gear 54, a sensor unit 55, and the dimmer units 8 and 9.

The base unit 7 includes a base body 71 formed of a metal plate, and supporting shafts 72, 73, and 74 attached to the base body 71 as shown in FIGS. 3 and 4. The base unit 7 is configured to support the motor 51 and the sensor unit 55 on the side of a surface 71A on one side of the base body 71 as shown in FIG. 3, and support the first gear 52, the second gear 53, and the third gear 54 on the side of a surface 71B on the other side of the base body 71 as shown in FIG. 4.

The base body 71 includes a first holding portion 711 having a rectangular shape in plan view, and a second holding portion 712 extending from a substantially center portion of one of the ends of the first holding portion 711. The light amount control device 5 is mounted on the side surface of the lower housing 61 with the second holding portion 712 positioned on the left side (+Z direction) and the surface 71A of the base body 71 directed rearward (−X direction) as shown in FIG. 2.

Specifically, upper and lower end portions and left and right end portions of the first holding portion 711 are partly bent toward the surface 71B as shown in FIGS. 3 and 4, and shaft mounting holes 7111 and 7112 are formed at a lower side and an upper side thereof, and round holes 7113 are formed on the right side (−Z side) thereof. The first holding portion 711 is also formed with an arcuate through hole (guide groove 7114) having a center at a center axis of the shaft mounting hole 7111 as shown in FIG. 3.

Bent portions of the first holding portion 711 at the upper, lower, left, and right end portions are formed so as to substantially surround the second gear 53 and the third gear 54 in cooperation with the base body 71 and the lower housing 61 when the light amount control device 5 is mounted on the lower housing 61, and are configured to restrain attachment of dust on the second gear 53, the third gear 54, and so on.

The second holding portion 712 is formed with round holes 7121 and 7122 at the center portion and the left side (+Z direction) thereof as shown in FIG. 4. As shown in FIG. 3, the second holding portion 712 is provided with a shaft mounting hole 7123 on the right side (−Z direction) of the second holding portion 712.

The supporting shafts 72, 73, and 74 are members configured to rotatably support the first gear 52, the second gear 53, and the third gear 54, respectively.

Figure 6:
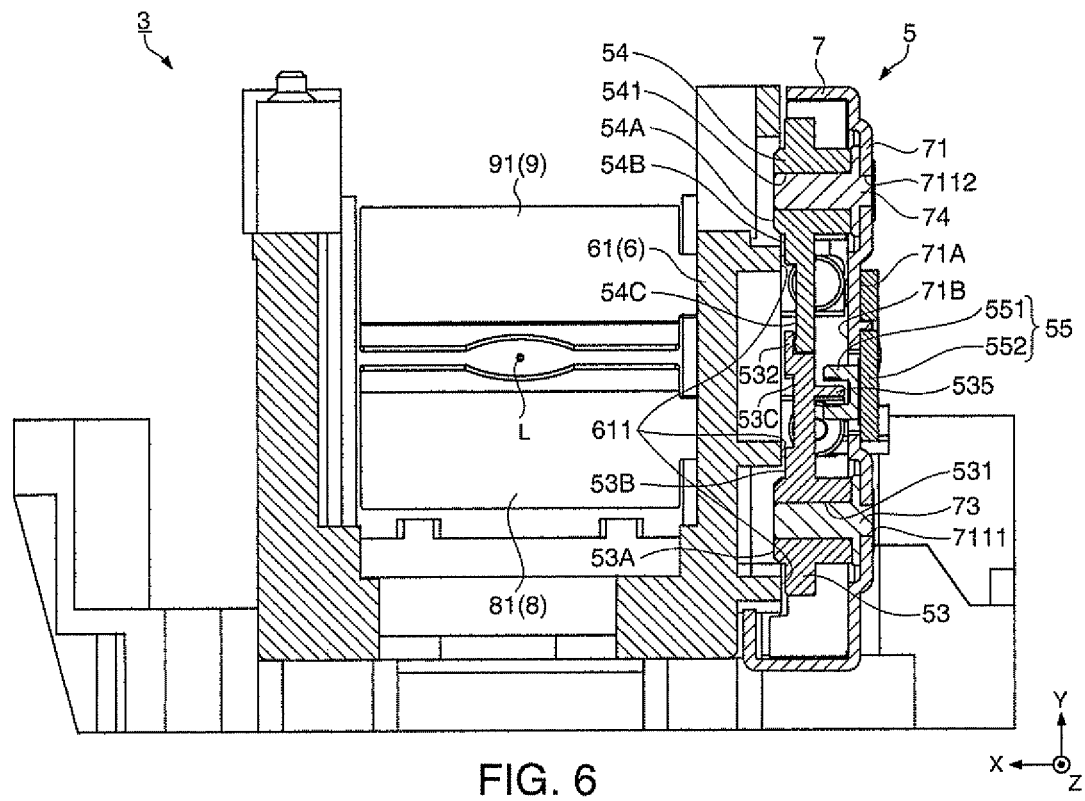
FIG. 6 is a cross-sectional view of the optical unit according to the first embodiment, showing a lower housing and the light amount control device.

FIG. 6 is a cross-sectional view of the optical unit 3, showing the lower housing 61 and the light amount control device 5.

The supporting shafts 73 and 74 are attached to the side of the surface 71B of the base body 71 as shown in FIG. 6. Specifically, the supporting shafts 73 and 74 are formed of metal into a column shape, and are press-fitted into the shaft mounting holes 7111 and 7112 of the base body 71 at one end of the each so as to project toward the front (+X direction) at the other end of the each as shown in FIG. 6. The supporting shafts 73 and 74 are set in diameter and length so as to allow the second gear 53 and the third gear 54 to rotate stably. The length of the supporting shafts 73 and 74 is set in such a manner that when the second gear 53 and the third gear 54 are inserted respectively thereto, distal end surfaces thereof are flush with the surfaces of the second gear 53 and the third gear 54, respectively.

The supporting shaft 72 is configured to be similar to the supporting shaft 73. One of the end portions thereof is press-fitted into the shaft mounting hole 7123 of the base body 71 so that the other end portion projects toward the front (+X direction) as shown in FIG. 4. The length of the supporting shaft 72 is set in such a manner that when the first gear 52 is inserted thereto, the distal end surface thereof is flush with the surfaces of the first gear 52.

The motor 51 is configured to generate a drive force for rotating the first gear 52, and is controlled by the control unit.

The motor 51 includes a motor body 511 having a spindle as the supporting shaft, and a pinion 512 provided at a distal end of the spindle as shown in FIGS. 3 and 4. The motor 51 is mounted on the surface 71A of the base body 71 with the screws SC as shown in FIGS. 3 and 4. Specifically, the motor 51 is mounted in such a manner that the motor body 511 is arranged on the side of the surface 71A (−X side) of the base body 71 and the pinion 512 projects toward the front (+X direction) from the round hole 7121.

The first gear 52 engages the pinion 512, and transmits the drive force generated by the motor 51 to the second gear 53.

Specifically, the first gear 52 is formed of synthetic resin and, as shown in FIG. 4, includes a large gear portion 521 and a small gear portion 522 formed coaxially one on top of another. The diameter of the large gear portion 521 is set to be larger than the diameters of the pinion 512 and the small gear portion 522. The first gear 52 is formed with a center hole having the center axis at a center axis of the rotation, and the center hole is set to have an inner diameter slightly larger than the outer diameter of the supporting shaft 72.

The first gear 52 is arranged on the side of the surface 713 of the base body 71 with the supporting shaft 72 inserted through the center hole thereof and the large gear portion 521 engaged with the pinion 512. The first gear 52 decelerates the rotation of the pinion 512 and transmits the same to the second gear 53.

The second gear 53 and the third gear 54 are formed of synthetic resin, include the dimmer units 8 and 9, respectively, and change the positions of the dimmer units 8 and 9 by the rotation of the first gear 52 being transmitted thereto. Specifically, the second gear 53 engages the first gear 52, and the third gear 54 engages the second gear 53. The second gear 53 and the third gear 54 rotate in the opposite directions from each other by the drive force of the motor 51 transmitted thereto via the first gear 52. The second gear 53 and the third gear 54 correspond to position changing units configured to rotate for changing the positions of the dimmer units 8 and 9.

More specifically, the second gear 53 has a semi-circular shape in plan view as shown in FIG. 4, and teeth to be engaged with the first gear 52 are formed on the outer periphery of the semi-circular shape (not shown). The second gear 53 is formed with a center hole 531 having the center axis at the center axis of the rotation, and the inner diameter of the center hole 531 is set to have an inner diameter slightly larger than the outer diameter of the supporting shaft 73. The second gear 53 is assembled to the base body 71 with the supporting shaft 73 inserted into the center hole 531 as shown in FIGS. 4 and 6, and rotates about an axial center of the supporting shaft 73. A range where the teeth are formed is set corresponding to the range in which the position of the dimmer unit 8 is changed. The light amount control device 5 is downsized by forming the second gear 53 into the semi-circular shape in comparison with the case where it is formed into a circular shape.

As shown in FIG. 4, the second gear 53 is formed to have surfaces 53A, 53B, and 53C which form steps on a surface on the front side (+X side) from a portion in the vicinity of the center hole 531 toward the outer periphery in such a manner that the surface 53A projects more than the surface 53B, and the surface 53B projects more than the surface 53C.

The second gear 53 is formed with a peripheral edge projection 532, a dimmer unit mounting portion 533, a locking projection 534, and a detection projection 535.

The peripheral edge projection 532 is formed so as to project from the surface 53C along the semi-circular outer periphery as shown in FIG. 4, and the outline thereof projects outward from the outline of the teeth.

The dimmer unit mounting portion 533 is a portion for mounting the dimmer unit 8 and, as shown in FIG. 4, is formed to have a portion projecting from the surface 53C at an end portion on the right side (−Z side) of the second gear 53. The dimmer unit mounting portion 533 is formed with a screw hole (not shown) opening toward the right, so that the dimmer unit 8 is mounted to the second gear 53 with the screw SC inserted into this screw hole as shown in FIG. 5.

The locking projection 534 is provided in the vicinity of the dimmer unit mounting portion 533 so as to project rearward (−X direction) from the surface opposite to the surface 53A and bent into an L-shape at the distal end as shown in FIG. 3. The locking projection 534 is inserted into the guide groove 7114 of the base body 71 when the second gear 53 is assembled to the base body 71, and is set in such a manner that a bent portion at the distal end thereof engages the surface 71A of the base body 71. The locking projection 534 is configured not to be dropped from the base body 71 within a predetermined range of rotation of the second gear 53 in a state in which the light amount control device 5 is not mounted to the lower housing 61. The second gear 53 is assembled to the base body 71 after having assembled the third gear 54 to the base body 71.

The detection projection 535 has a function to shield the light emitted from a photo sensor 551 provided on the sensor unit 55. The detection projection 535 is an arcuate projection having the center axis at the center axis of the center hole 531, and projects rearward (−X direction) from a surface opposite to the surface 53A. The detection projection 535 is configured to be insertable into a depression of the photo sensor 551 as shown in FIG. 6.

The third gear 54 has a semi-circular shape in plan view as shown in FIG. 4, and teeth to be engaged with the second gear 53 are formed on the outer periphery of the semi-circular shape. The third gear 54 is formed with a center hole 541 having the center axis at the center axis of the rotation, and the inner diameter of the center hole 541 is set to have an inner diameter slightly larger than the outer diameter of the supporting shaft 74. The third gear 54 is assembled to the base body 71 with the supporting shaft 74 inserted into the center hole 541 as shown in FIGS. 4 and 6, and rotates about the axial center of the supporting shaft 74. A range where the teeth are formed is set corresponding to the range in which the position of the dimmer unit 9 is changed as in the case of the second gear 53. The light amount control device 5 is downsized by forming the third gear 54 into the semi-circular shape in comparison with the case where it is formed into a circular shape.

As shown in FIG. 4, the third gear 54 is formed to have surfaces 54A, 54B, and 54C which form steps on a surface on the front side (+X side) from a portion in the vicinity of the center hole 541 toward the outer periphery in such a manner that the surface 54A projects more than the surface 54B, and the surface 54B projects more than the surface 54C.

The third gear 54 is formed with a dimmer unit mounting portion 542 for mounting the dimmer unit 9. The dimmer unit mounting portion 542, as shown in FIG. 4, is formed to have a portion projecting from the surface 54C at an end portion on the right side (−Z side) of the third gear 54. The dimmer unit mounting portion 542 is formed with a screw hole (not shown) opening toward the right, so that the dimmer unit 9 is mounted to the third gear 54 with the screw SC inserted into this screw hole as shown in FIG. 5.

As shown in FIG. 4, when the second gear 53 is inserted onto the supporting shaft 73 after having inserted the third gear 54 onto the supporting shaft 74, the third gear 54 is arranged in such a manner that part of the peripheral edge portion thereof is clamped between the peripheral edge projection 532 of the second gear 53 and the base body 71. In other words, in the state in which the light amount control device 5 is not mounted on the lower housing 61, the second gear 53 is configured not to drop from the base body 71 within the predetermined range of rotation. Therefore, the third gear 54 is configured not to drop from the base body 71 within the predetermined range of rotation of the second gear 53.

As shown in FIG. 6, when the light amount control device 5 is mounted on the lower housing 61, the second gear 53 and the third gear 54 are arranged in such a manner that the surfaces 53B and 54B are positioned with a slight clearance with the side surface portions 611, respectively. In other words, the second gear 53 and the third gear 54 are clamped between the base unit 7 and the lower housing 61 in a direction substantially orthogonal to the axial centers of the supporting shafts 73 and 74, respectively. Accordingly, the second gear 53 and the third gear 54 are able to rotate stably.

The sensor unit 55 has a function to detect the position of the second gear 53, that is, the position of the dimmer unit 8 mounted to the second gear 53. The sensor unit 55 includes the photo sensor 551 and a circuit board 552 as shown in FIGS. 3 and 6, and is mounted on the surface 71A by a screw SC so that the photo sensor 551 projects toward the front from the base body 71.

The sensor unit 55 shields light applied on the detection projection 535 from the photo sensor 551 when the second gear 53 is rotated and reaches a predetermined position. Then, the sensor unit 55 detects the position of the dimmer unit 8 maintained by the second gear 53 by a change of detection of the light. Then, the sensor unit 55 outputs a detection signal relating to a detected state about the position of the dimmer unit 8 to the control unit.

The dimmer units 8 and 9 are arranged between the first lens array 321 and the second lens array 322 as described above. The dimmer units 8 and 9 are changed in position in association with the rotation of the second gear 53 and the third gear 54, and the amounts being inserted into an area in which the luminous flux passing through the first lens array 321 goes out (hereinafter, referred to as transmitting area) is changed. The dimmer units 8 and 9 then reflect and shield the luminous flux according to the amounts being inserted into the transmitting area out of the transmitting area. In other words, the dimmer units 8 and 9 dim the light source luminous flux by shielding part of the light source luminous flux.

The dimmer units 8 and 9 include light-shielding members 81 and 91 and holding members 82 and 92 respectively, and are formed in substantially symmetry with respect to a plane passing through the optical axis L and extending along the X-direction as shown in FIG. 6.

The light-shielding members 81 and 91 are formed of a panel member formed of aluminum or the like and are members for shielding part of the light source luminous flux.

Figure 7:
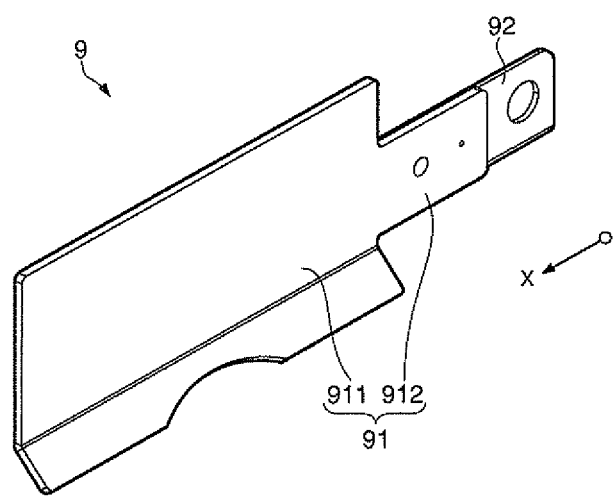
FIG. 7 is a perspective view of a dimmer unit according to the first embodiment.
Figure 8:
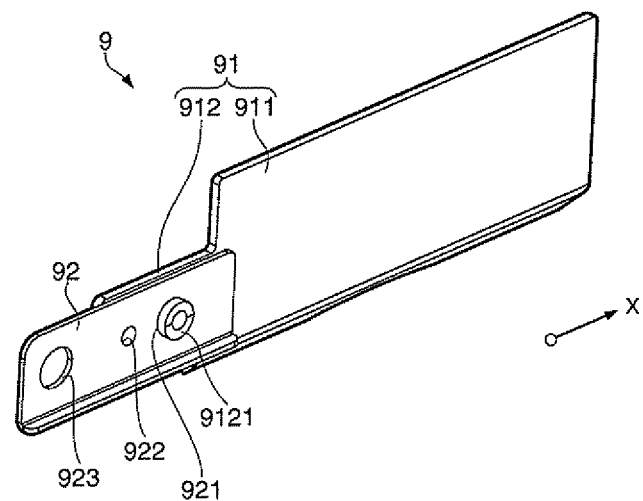
FIG. 8 is a perspective view of the dimmer unit according to the first embodiment.

FIGS. 7 and 8 are perspective view of the dimmer unit 9. FIG. 7 is a drawing of the dimmer unit 9 of the light amount control device 5 in FIG. 4 viewed from the +Z direction, and FIG. 8 is a drawing of the dimmer unit 9 of the light amount control device 5 in FIG. 4 viewed from the −Z direction. The light-shielding member 91 has a longitudinal direction in the X direction as shown in FIG. 7, and includes a light-shielding body portion 911 and a mounting portion 912.

The light-shielding body portion 911 is a portion for shielding part of the light source luminous flux. The longitudinal dimension of the light-shielding body portion 911 is set according to the dimension in the same direction of the area of the second lens array 322 where the respective small lenses are formed, and the short side dimension of the same is set to substantially half the dimension in the same direction of the same area where the respective small lenses are formed.

The mounting portion 912 is a portion to be mounted to the holding member 92 and, as shown in FIG. 7, extends from a substantially center portion of the end portion on the −X side of the light-shielding body portion 911 and is formed into a rectangular shape. The mounting portion 912 is formed with a large projection 9121 in the vicinity of the light-shielding body portion 911 as shown in FIG. 8, and a small projection (not shown) is formed on the −X side of the large projection 9121.

The light-shielding member 81 is formed in the same manner as the light-shielding member 91. The material of the light-shielding members 81 and 91 is not limited to aluminum, and may be materials having a coefficient of thermal conductivity of 100 W/m·k or higher, such as copper or magnesium or, alternatively, alloy containing aluminum, copper, or magnesium.

The holding members 82 and 92 are members configured to hold the light-shielding members 81 and 91 respectively, and to be attached to the second gear 53 and third gear 54 respectively. In other words, the light-shielding members 81 and 91 are attached to the second gear 53 and the third gear 54 via the holding members 82 and 92, respectively.

The holding members 82 and 92 are formed of plate members of a material having a coefficient of thermal conductivity lower than that of the light-shielding members 81 and 91, for example, stainless steel or the like.

The holding member 92 has a longitudinal direction in the X direction as shown in FIG. 8, and one of the longitudinal sides is bent. The holding member 92 is formed with a hole 921 which allows fitting of the large projection 9121 of the mounting portion 912 in the vicinity of the end portion on the +X side and a hole 922 which allows fitting of a small projection of the mounting portion 912 in the −X direction of the hole 921. The holding member 92 is provided with a round hole 923 in the vicinity of the end portion in the −X side.

The holding member 92 is laminated so that the round hole 923 projects from the end portion of the mounting portion 912 and is attached to the light-shielding member 91 via caulking. Specifically, the holding member 92 is fixed to the light-shielding member 91 with the large projection 9121 of the mounting portion 912 and the small projection of the mounting portion 912 inserted into the holes 921 and 922 respectively, and the large projection 9121 projecting from the surface of the holding member 92 caulked.

Then, the dimmer unit 9 is attached to the third gear 54 with the screws SC inserted into the round hole 923 of the holding member 92 as shown in FIG. 5.

The holding member 82 is formed in the same manner as the holding member 92 and is fixed to the light-shielding member 81. Then, the dimmer unit 8 is attached to the second gear 53 with the screws SC as shown in FIG. 5.

Here, an operation of the light amount control device 5 will be described.

When the motor 51 is driven, the dimmer units 8 and 9 are rotated so as to be moved toward and away from each other by the rotation of the second gear 53 and the third gear 54 via the first gear 52, and the amounts being inserted into the transmitting area is changed. Then, the dimmer units 8 and 9 shield part of the light source luminous flux according to the amounts being inserted into the transmitting area, and output the luminous flux which is not shielded and hence passes therethrough to the second lens array 322.

Specifically, as shown in FIG. 4, when the dimmer units 8 and 9 are inserted into the transmitting area so as to move toward each other as shown in FIG. 4, most part of the light source luminous flux is reflected by the light-shielding members 81 and 91, and a very small amount of luminous flux passing through a gap between the adjacent light-shielding members 81 and 91 enters the second lens array 322.

Figure 9:
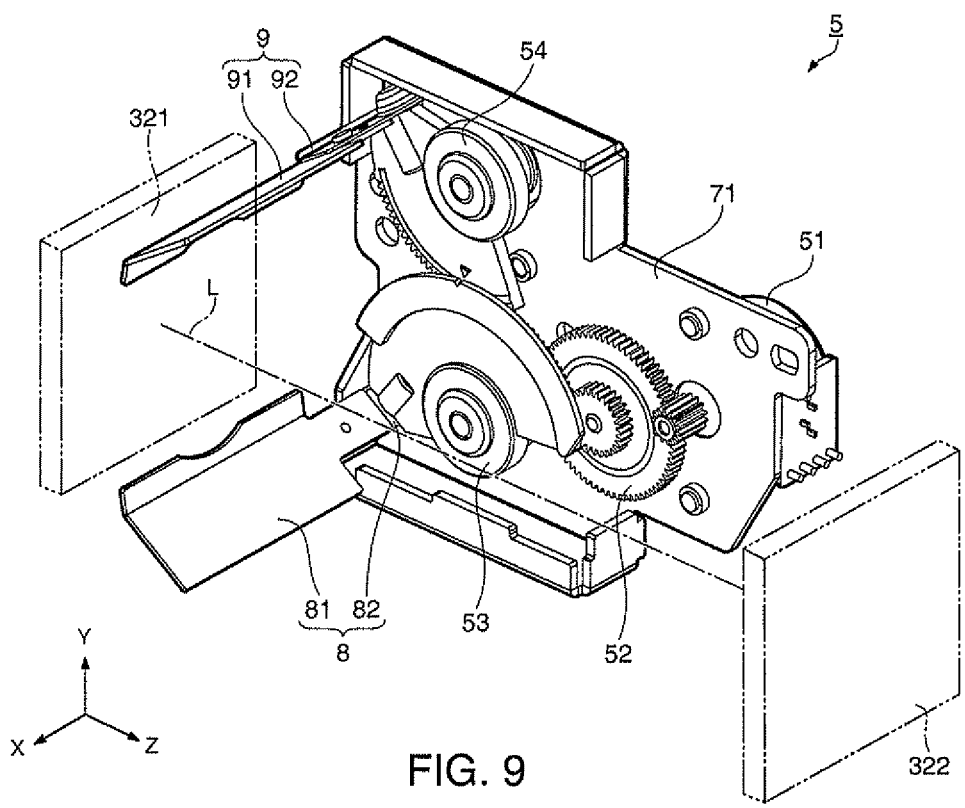
FIG. 9 is a perspective view of the light amount control device according to the first embodiment.

FIG. 9 is a perspective view of the light amount control device 5. Specifically, FIG. 9 is a drawing showing a case where the dimmer units 8 and 9 of the light amount control device 5 are rotated to move away from each other in comparison with the state shown in FIG. 4. FIG. 9 includes the first lens array 321 and the second lens array 322 (shown by double-dashed chain lines) shown schematically for the sake of convenience of description in the same manner as FIG. 4.

As shown in FIG. 9, when the dimmer units 8 and 9 are rotated away from the state close to each other, that is, when they are rotated so that the amounts being inserted into the transmitting area is reduced, the amount of light of the luminous flux shielded by the light-shielding members 81 and 91 is reduced, and the luminous flux having a larger amount of light enters the second lens array 322.

In this manner, the light amount control device allows the luminous flux of the amount of light according to the distance between the dimmer units 8 and 9 to pass through and outputs the same to the second lens array 322 by the change of the amounts of the dimmer units 8 and 9 to be inserted into the transmitting area. Then, the luminous flux entering the second lens array 322 is projected by the projection lens 36 after an image light having an amount of light corresponding to the amount of light passing through the light amount control device 5 has formed by the electro-optic unit 35.

As described above, according to the projector 1 in the embodiment, the following effects are achieved.

(1) The light-shielding members 81 and 91 are attached to the second gear 53 and the third gear 54 via the holding members 82 and 92, and the holding members 82 and 92 are formed of a material having a coefficient of thermal conductivity lower than the coefficient of thermal conductivities of the light-shielding members 81 and 91. Accordingly, when the temperatures of the light-shielding members 81 and 91 rise in association with shielding of the luminous flux, the heat of the light-shielding members 81 and 91 is hardly transferred to the holding members 82 and 92, whereby the temperature rise is restrained. Then, temperature rises of the second gear 53 and the third gear 54 to which the holding members 82 and 92 are attached respectively are also restrained. Therefore, the second gear 53 and the third gear 54 are restrained from being subjected to thermal deformation or the like, and are able to be maintained stably in shape, so that the positions of the light-shielding members 81 and 91 can adequately be changed. Therefore, according to the projector 1, the light amount control device 5 controls the amount of light stably even when the temperatures of the light-shielding members 81 and 91 rise, so that enhancement of the image quality such as contrast is achieved for projection of the image.

(2) Since the temperature rises of the second gear 53 and the third gear 54 are restrained, temperature rises of the base body 71 in which the second gear 53 and the third gear 54 are built in, and the motor 51 and the first gear 52 supported by the base body 71 are also restrained so that the light amount control device 5 is able to control the amount of light stably. In addition, temperature rises of the optical components arranged in the vicinity of the base body 71, for example, the first lens array 321, the second lens array 322, and the polarization conversion element 323 are also restrained, so that the projector 1 is able to project images while maintaining the quality of the images.

(3) Since the light-shielding members 81 and 91 are formed of a member having a coefficient of thermal conductivity of 100 W/m·k or higher, for example, aluminum, copper, magnesium, and alloys containing the same, undesired part of the luminous flux is reliably shielded by the light-shielding members 81 and 91, and the light amount control device 5 is able to control the amount of light highly efficiently.

Since the members such as aluminum can easily be machined to complicated shapes such as bending, drawing or the like, attachment of the light-shielding members 81 and 91 to the holding members 82 and 92 is easily achieved by caulking or the like, whereby simplification of the number of steps for assembling the light amount control device 5, or cost reduction is achieved.

Second Embodiment

Referring now to the drawings, a projector 1 according to a second embodiment will be described.

In the following description, like numbers reference like configurations and like members in the first embodiment, and detailed description will be omitted or simplified.

The projector 1 in the second embodiment has a pair of light-shielding member having different shape from the light-shielding members 81 and 91 in the first embodiment, respectively. The pair of light-shielding member is formed of a plate member of aluminum or the like in substantially symmetry with each other in the same manner as the light-shielding members 81 and 91, and are attached to the second gear 53 and the third gear 54 via the holding members 82 and 92.

Here, a light-shielding member 191 to be attached to the third gear 54 via the holding member 92 will be described with reference to the drawings.

Figure 10:
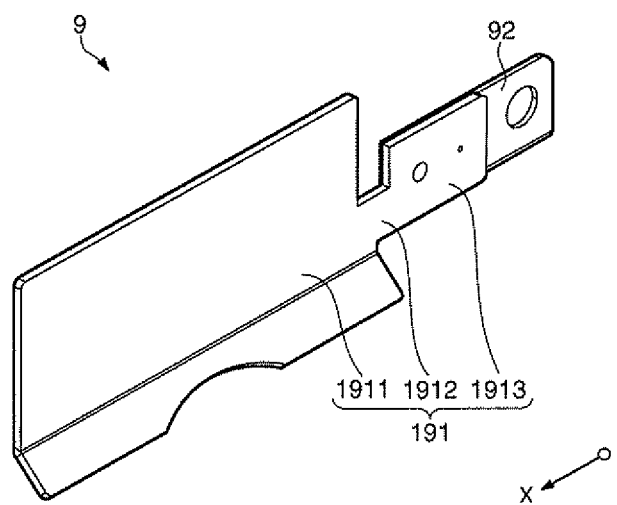
FIG. 10 is a perspective view of the dimmer unit according to a second embodiment.

FIG. 10 is a perspective view of the dimmer unit 9.

The light-shielding member 191 includes a light-shielding body portion 1911, a mounting portion 1913, and a bridge portion 1912.

The light-shielding body portion 1911 is a portion for shielding part of the light source luminous flux, and has the substantially same shape as the light-shielding body portion 911 in the first embodiment. The mounting portion 1913 is a portion to be attached to the holding member 92, has the substantially the same shape as the mounting portion 912 in the first embodiment, and is provided apart from the light-shielding body portion 1911.

The bridge portion 1912 is a portion bridged between the light-shielding body portion 1911 and the mounting portion 1913, and is formed to have a notch between the light-shielding body portion 1911 and the mounting portion 1913. In other words, the bridge portion 1912 is formed to have a cross-sectional area smaller than the cross-sectional area of the light-shielding body portion 1911 and the mounting portion 1913 in a cross-section substantially orthogonal to a direction from the light-shielding body portion 1911 to the mounting portion 1913.

Then, the light-shielding member 191 is attached to the holding member 92 by caulking in the same manner as the light-shielding member 91 in the first embodiment, and the holding member 92 is fixed to the third gear 54 with a screw.

The other light-shielding member, not shown, formed in substantially symmetry with the light-shielding member 191 is formed to have a bridge portion in the same manner as the light-shielding member 191, and is attached to the holding member 82 by caulking, and the holding member 82 is fixed to the second gear 53 with a screw.

As described above, according to the projector 1 in the second embodiment, the following effects are achieved.

Since the bridge portion 1912 is formed to have a cross-sectional area smaller than the cross-sectional area of the light-shielding body portion 1911 and the mounting portion 1913, when the temperature rises in association with the shielding of the luminous flux by the light-shielding body portion 1911, the heat is hardly transferred from the light-shielding body portion 1911 to the mounting portion 1913, whereby the temperature rise of the mounting portion 1913 is restrained. Therefore, the temperature rise of the holding member 92 where the mounting portion 1913 is attached, and hence the temperature rise of the third gear 54 are restrained, whereby the third gear 54 is restrained further from the thermal deformation. In the same manner, the temperature rise of the second gear 53 is further restrained, and hence the second gear 53 is further restrained from the thermal deformation.

Third Embodiment

Referring now to the drawings, a projector according to a third embodiment will be described.

In the following description, like numbers reference like configurations and like members in the first embodiment, and detailed description will be omitted or simplified.

The projector 1 in the third embodiment has a pair of light-shielding member having different shape from the light-shielding members 81 and 91 in the first embodiment, respectively. The pair of light-shielding member is formed of a plate member of aluminum or the like in substantially symmetry with each other in the same manner as the light-shielding members 81 and 91, and are attached to the second gear 53 and the third gear 54 via the holding members 82 and 92.

Here, a light-shielding member 291 to be attached to the third gear 54 via the holding member 92 will be described with reference to the drawings.

Figure 11:
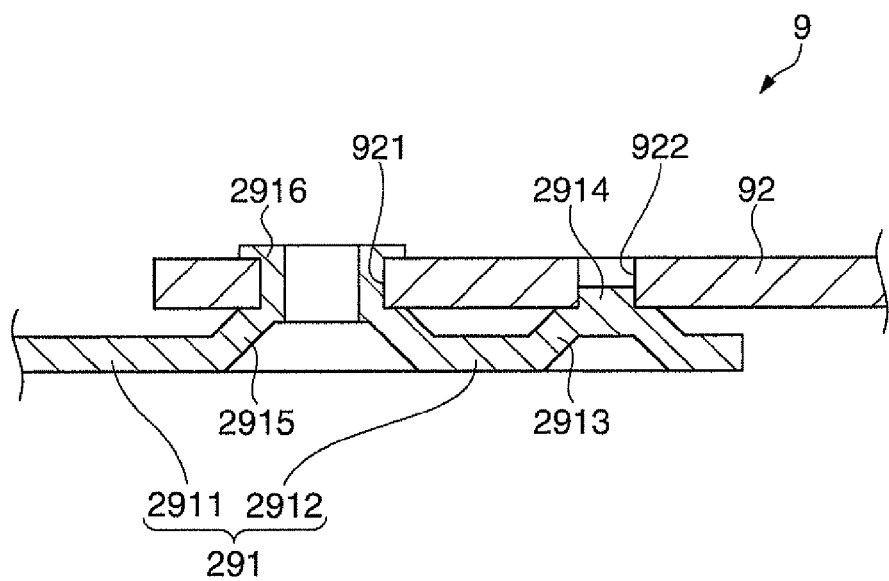
FIG. 11 is a cross-sectional view of the dimmer unit according to a third embodiment.

FIG. 11 is a cross-sectional view of the dimmer unit 9.

The light-shielding member 291 includes a light-shielding body portion 2911 and a mounting portion 2912 as shown in FIG. 11.

The light-shielding body portion 2911 is formed in the same manner as the light-shielding body portion 911 in the first embodiment. The mounting portion 2912 is different from the mounting portion 912 in the first embodiment in that the mounting portion 2913 has the projections 2913 and 2915 projecting on the side of the same surface.

The projection 2915 is formed by pressing work, and is formed to have an outer diameter slightly larger than the inner diameter of the hole 921 of the holding member 92. The projection 2915 is formed with a large projection 2916 which allows fitting into the hole 921 at a center portion thereof.

The projection 2913 is also formed by pressing work, and is formed to have an outer diameter slightly larger than the inner diameter of the hole 922 of the holding member 92. The projection 2913 is formed with a small projection 2914 which allows fitting into the hole 922 at a center portion thereof.

The light-shielding member 291 is attached to the holding member 92 with the projections 2913 and 2915 being abutted with one of the surfaces of the holding member 92. Specifically, the light-shielding member 291 is fixed to the holding member 92 with the large projection 2916 and the small projection 2914 inserted into the holes 921 and 922, respectively, and the large projection 2916 projecting from the surface of the holding member 92 caulked. In this manner, the light-shielding member 291 is in abutment with the holding member 92 via the projections 2913 and 2915.

The other light-shielding member, not shown, formed in substantially symmetry with the light-shielding member 291 is formed to have two projections in the same manner as the light-shielding member 291, and is in abutment with the holding member 82 via the two projections.

As described above, according to the projector 1 in the third embodiment, the following effects are achieved.

Since the light-shielding member 291 is in abutment with the holding member 92 via the projections 2913 and 2915, the surface area of abutment between the light-shielding member 291 and the holding member 92 is small, so that the periphery of a portion of abutment between the both members allows air to circulate. Therefore, heat from the light-shielding member 291 can further hardly be transferred to the holding member 92, the temperature rise of the third gear 54 is restrained, whereby the third gear 54 is restrained further from the thermal deformation. In the same manner, the temperature rise of the second gear 53 is further restrained, and hence the second gear 53 is further restrained from the thermal deformation.

Fourth Embodiment

Referring now to the drawings, a projector 1 according to a fourth embodiment will be described.

In the following description, like numbers reference like configurations and like members in the first embodiment, and detailed description will be omitted or simplified.

The projector 1 in the fourth embodiment has a configuration in which heat-shielding members for restraining heat transfer are arranged between the holding member 82 and the second gear 53 and between the holding member 92 and the third gear 54, respectively.

Here, the configuration in which the heat-shielding member is arranged between the holding member 92 and the third gear 54 will be described with reference to the drawings.

Figure 12:
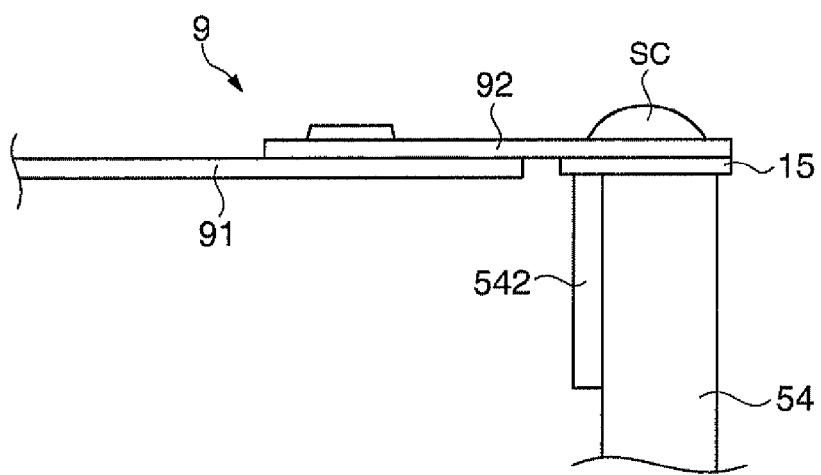
FIG. 12 is a side view of the dimmer unit and a third gear according to a fourth embodiment.

FIG. 12 is a side view of the dimmer unit 9 and the third gear 54 showing a portion in the vicinity of the dimmer unit mounting portion 542.

As shown in FIG. 12, a heat-shielding member 15 is arranged between the holding member 92 and the dimmer unit mounting portion 542.

The heat-shielding member 15 is formed of a material having a heat-shielding property such as polyimide resin or the like into a sheet shape. The heat-shielding member 15 is formed with a hole to allow insertion of the screws SC. The heat-shielding member 15 is arranged between the holding member 92 and the third gear 54, and is attached to the third gear 54 together with the holding member 92. In the same manner, the heat-shielding member 15 is also arranged between the holding member 82 and the second gear 53. The heat-shielding member 15 is not limited to be the sheet-shape, but may be formed into a foaming state, or into a non-woven fabric state.

As described above, according to the projector 1 in the fourth embodiment, the following effects are achieved.

Since the heat-shielding members 15 are arranged between the holding member 82 and the second gear 53, and between the holding member 92 and the third gear 54, heat can hardly be transferred from the holding members 82 and to the second gear 52 and the third gear 54, respectively. Therefore, heat from the light-shielding members 81 and 91 can further hardly be transferred to the second gear 53 and the third gear 54, and the second gear 53 and the third gear 54 are restrained from the thermal deformation.

MODIFICATION

The embodiments may be changed as follows.

The light-shielding members 81 and 91 may be formed of members applied with gloss treatment by polishing work or plating. Accordingly, the reflectance ratio of the luminous flux shielded by the light-shielding members 81 and 91 is increased in comparison with a case of using the members which are not applied with the gloss treatment, so that the temperature rise of the light-shielding members 81 and 91 is small, and the temperature rise of the second gear 53 and the third gear 54 is restrained.

The light amount control device 5 in the embodiments describe above is configured in such a manner that position changing units (the second gear 53 and the third gear 54) rotate in order to change the positions of the light-shielding members 81 and 91. However, it is also possible to configure the same to be changed in position by a sliding movement of the position changing unit in the vertical direction or in the fore-and-aft direction.

Although the light-shielding member 291 is provided with the projections 2913 and 2915, and the projections 2913 and 2915 come into abutment with the holding member 92 in the third embodiment, a configuration in which a projection is provided on the holding member 92 and the projection comes into abutment with the light-shielding member 291 is also applicable.

Although the heat-shielding members 15 are arranged between the holding members 82 and 92 and the second gear 53 and the third gear 54 respectively in the fourth embodiment, the heat-shielding members 15 may be arranged between the light-shielding members 81 and 91 and the holding members 82 and 92, respectively. The heat-shielding members 15 may be arranged between the holding members 82 and 92 and the second gear 53 and the third gear 54, and between the light-shielding members 81 and 91 and the holding members 82 and 92, respectively.

Although the projector 1 in the embodiments described above employs the transmissive liquid crystal panels 352 as the light modulation device, a reflective liquid crystal panels may also be employed. The light modulation device may be those employing devices using a micro-mirror array.

Although the projector 1 applied in the embodiments described above is the front type projector 1, the invention is also applicable to a rear type projector having a screen integrally as a projection target surface.

The present application claim priority from Japanese Patent Application No. 2009-016309 filed on Jan. 28, 2009, which is hereby incorporated by reference in its entirety.

What is claimed is:

1. A projector comprising:
   a light source;
   a light amount control device configured to control an amount of passing light of a luminous flux emitted from the light source;
   an electro-optic unit configured to modulate the luminous flux passing through the light amount control device according to image data and form an image light; and
   a projection device configured to project the image light, the light amount control device includes:
      a light-shielding member configured to shield part of the luminous flux emitted from the light source;
      a holding member configured to hold the light-shielding member, the holding member being formed of a material having a coefficient of thermal conductivity lower than a coefficient of thermal conductivity of the light-shielding member; and
      a position changing unit configured to move or rotate in order to change the position of the light-shielding member, wherein
         the light-shielding member is attached to the position changing unit via the holding member,
         the light-shielding member comes into contact with the holding member via a projection provided on at least one of the light-shielding member and the holding member,
         the light amount control device has an area in which the light-shielding member and the holding member overlap,
         the projection, within the area, projects from at least one of the light-shielding member and the holding member in a direction of lamination, and abuts the other of the light-shielding member and the holding member, and
         the projection, which is formed on a surface of one of the light-shielding member and the holding member, contacts an opposing and adjacent surface of the other one of the light-shielding member and the holding member.

2. The projector according to claim 1, wherein the light-shielding member further comprises:
   a light-shielding body portion configured to shield part of the luminous flux;
   a mounting portion to be mounted on the holding member, wherein only the mounting portion is laminated onto the holding member and attached to the holding member; and a bridge portion that is bridged between the light-shielding body portion and the mounting portion, and is formed to have a notch between the light-shielding body portion and the mounting portion, wherein the bridge portion has a cross-sectional area smaller than the cross-sectional areas of the light-shielding body portion and the mounting portion in a cross section substantially orthogonal to a direction from the light-shielding body portion toward the mounting portion.

3. The projector according to claim 1, further comprising a heat-shielding member configured to restrain heat transfer, the heat-shielding member being arranged between at least one of the light-shielding member and the holding member, and the holding member and the position changing unit.

4. The projector according to claim 1, wherein the light-shielding member is formed of a material having a coefficient of thermal conductivity of 100 w/m·k or higher.

5. The projector according to claim 1, wherein the light-shielding member is configured to rotate.

6. The projector according to claim 1, wherein the light-shielding member further comprises a flange arranged at an angle extending away from the light-shielding member.

7. A projector comprising:
a light source;
a light amount control device configured to control an amount of passing light of a luminous flux emitted from the light source;
an electro-optic unit configured to modulate the luminous flux passing through the light amount control device according to image data and form an image light; and
a projection device configured to project the image light, the light amount control device includes:
a base body;
a light-shielding member configured to shield part of the luminous flux emitted from the light source;
a holding member configured to hold the light-shielding member, the holding member being formed of a material having a coefficient of thermal conductivity lower than a coefficient of thermal conductivity of the light-shielding member, and the holding member being formed of stainless steel; and
a position changing unit configured to move or rotate in order to change the position of the light-shielding member, the position changing unit being formed of composite resin, wherein the holding member and the position changing unit are arranged on a same side of the base body, the light-shielding member is attached to the position changing unit via the holding member, and the light-shielding member further comprises:

a light-shielding body portion configured to shield part of the luminous flux;

a mounting portion to be mounted on the holding member, wherein only the mounting portion is laminated onto the holding member and attached to the holding member; and a bridge portion that is bridged between the light-shielding body portion and the mounting portion, and is formed to have a notch between the light-shielding body portion and the mounting portion, wherein the bridge portion has a cross-sectional area smaller than the cross-sectional areas of the light-shielding body portion and the mounting portion in a cross section substantially orthogonal to a direction from the light-shielding body portion toward the mounting portion.

\* \* \* \* \*